Sept. 3, 1957 M. B. RASMUSSON 2,804,880
FLOAT VALVE
Filed Aug. 16, 1956
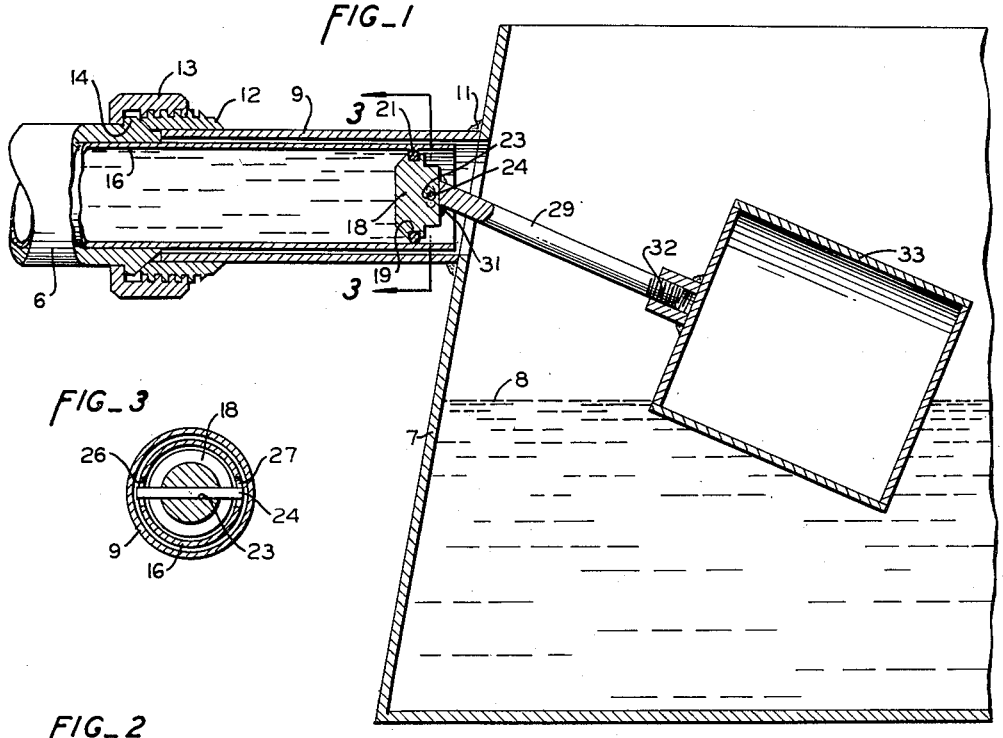
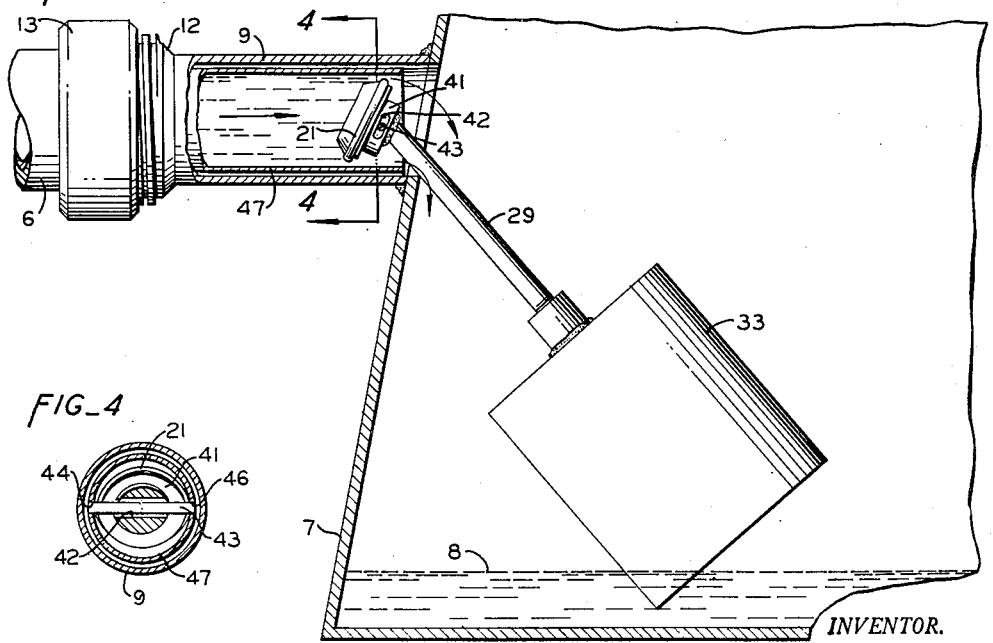
INVENTOR.
MARLIN B. RASMUSSON
BY Lothrop & West
ATTORNEYS

United States Patent Office 2,804,880
Patented Sept. 3, 1957

2,804,880

FLOAT VALVE

Marlin B. Rasmusson, Sacramento, Calif.

Application August 16, 1956, Serial No. 604,485

5 Claims. (Cl. 137—422)

My invention relates primarily to valves controlled by floats and especially for use in critical environments such as conduits conducting fluid food stuffs; for example, ice cream mixes or water ice mixes. Material of this sort must necessarily be handled under highly sanitary conditions and all of the mechanism with which it comes into contact must be able to be readily cleaned. In addition, the nature of the fluid is variable from time to time and often the characteristics are such that it is difficult to effectuate appropriate closure and absence of leakage of a valve while providing for ready opening and relatively free flow therethrough. It is also sometimes the case that a valve in this environment will nearly close or just fail to open because of some inaccuracies in repositioning after cleaning disassembly or because of some dfficulties with the fluid or for other reasons.

It is therefore an object of my invention to provide a float valve especially adapted for use as indicated and in which the valve is relatively simple and can easily be cleaned.

Another object of the invention is to provide a float valve of a construction such that it will readily close tightly and as readily open.

Another object of the invention is to provide a float valve effective for use with liquids of different flow characteristics.

Another object of the invention is to provide a float valve which is easy and simple to make and repair.

Another object of the invention is in general to provide an improved float valve.

Other objects together with the foregoing are attained in the embodiments of the invention described in the accompanying description and illustrated in the accompanying drawings, in which:

Figure 1 is a cross-section on a vertical central plane through a closed float valve of my invention as it is installed in a tank.

Figure 2 is a view similar to Figure 1 showing the valve in open rather than closed position and showing a valve of slightly modified construction.

Figure 3 is a cross-section, the plane of which is indicated by the line 3—3 of Figure 1.

Figure 4 is a cross-section, the plane of which is indicated by the line 4—4 of Figure 2.

In general, the float valve is usually installed in connection with ice cream and water ice confection manufacture and is therefore so described herein. In this environment the water ice mixture, for example, is received through a conduit 6 from any suitable source and is destined to enter a tank 7 to rise to a predetermined level 8 therein. The tank 7 is of any suitable construction and for this purpose is usually made of stainless steel. It is provided at a convenient location with a circular cylindrical nipple 9 connected thereto by welding 11 or other appropriate fastening means so that the nipple 9 preferably extends substantially in a horizontal direction, although that is not essential. The nipple 9 at its outermost end is provided with a threaded ring 12 designed to receive a coupling 13 forming part of the conduit 6 and abutting a shoulder 14 thereon.

Included with the conduit 6 and designed to telescope within the nipple 9 is a sleeve 16. This preferably is of stainless material such as is used in the other parts of this junction and fits within the nipple 9 with a slight clearance. When the coupling 13 is tightened, the sleeve 16 is substantially centered in telescoped position rigidly within the nipple 9. When the coupling 13 is released, the sleeve can readily be withdrawn from the nipple.

Pursuant to the invention, a valve plug 18 is provided within the sleeve 16 near one end thereof. This is conveniently a body of stainless material preferably turned so as to have a number of circular surfaces and provided with a peripheral groove 19 of a shape to receive a sealing ring 21. This conveniently is of rubber, artificial rubber or one of the substantially inert plastics such as "Teflon." The ring 21 is normally of circular cross-section when relaxed, and is slightly deformable so as to conform precisely with the interior of the sleeve 16 when thrust thereagainst. Furthermore the ring 21 is slightly larger in outside diameter than the maximum diameter of the valve plug 19 so that the valve plug is movable toward and away from the walls of the sleeve 16 in small amounts.

In the form of the device shown in Figures 1 and 3, the valve body 18 is provided with a diametrical cross bore 23 of circular cross-section through which a cross shaft 24 also of circular cross-section is extended. Preferably the shaft has a very light push fit within the bore 23. The oppositely extending ends of the cross shaft 24 pass into and through apertures 26 and 27 diametrically opposite each other in the walls of the sleeve 16. The axial or longitudinal dimension of the apertures is only slightly greater than that of the shaft 24 so that the shaft has substantially no axial or longitudinal displacement in the apertures. However, the circumferential or transverse extent of the apertures is considerably greater than the dimension in that direction of the cross shaft. Thus the cross shaft can not only turn about its transverse axis but also can rotate about the longitudinal axis of the valve body and of the sleeve 16 and can also rise and fall therein.

The apertures 26 and 27 are elongated and are generally described herein as elliptical although their contour may not be precisely that of a geometric ellipse, the point being that the apertures are loose fits on the cross shaft in a circumferential direction but relatively snug fits in an axial direction. The ends of the cross shaft stop just short of the interior wall of the nipple 9. The shaft when installed within the sleeve 16 is therefore displaceable along its own length slightly but is confined by the sleeve and cannot move far enough to become disengaged from either of the apertures 26 or 27.

Means for operating the valve plug is provided. A valve stem 29, secured to the valve plug by welding 31 or the like, extends for some distance through the sleeve 16 and also through the nipple 9 and into the interior of the tank 7. At its outermost or outboard end the stem 29 preferably has a threaded connection 32 with a float 33.

In the operation of this assembly device, the float 33 rises and falls and turns the valve plug 18 about the axis of the shaft 24, approximately. In the event there are any discrepancies of manufacture or of fit the valve plug shifts slightly either by rotating about a longitudinal axis, or a transverse axis or by moving bodily transversely of the sleeve to accommodate the discrepancy. Furthermore, the lost motion connection provided between the shaft 24 and the sleeve 16 permits some motion of the valve body 18 accompanied by some deflection of the ring 19 in order to equalize the forces and stresses on the ring to assure a uniform pressure seal.

Since there is not a strict pivotal movement of the valve body due to the deformability of the ring 21 and the elliptical apertures 26 and 27, the level of liquid 8 within the tank 7 can rise or fall in small increments without necessarily displacing the ring 21 away from the wall of the sleeve 16. There may be merely a change in the fulcrum of the cross shaft as permitted by the elongated or elliptical apertures 26 and 27 and the slight deformation of the surrounding ring 19. This imparts a sort of snap action to the operation of the valve and assures its prompt and tight seating and prompt and quick opening.

When the device is disassembled for cleaning it can be done in either of two ways. The float 33 can be unscrewed from the stem 29 and then the coupling 13 can be unscrewed. The sleeve 16 can be withdrawn from the nipple 9 carrying with it the valve plug 18 and the stem 29. When these parts have passed the end of the nipple 9, the cross shaft 24 can be removed transversely and the valve plug 18 then can be taken out of the sleeve 16 for any further attention. The assembly is in the reverse order. When the stem 29 is made somewhat longer than is shown in Figure 1, then after the coupling 13 is released and as the sleeve 16 is being withdrawn, the stem 29 enters far enough into the nipple 9 until the cross shaft 23 is beyond the end of the coupling 13. The shaft 24 can then be withdrawn transversely. The operator by grasping the still attached float 33 can then withdrawn the stem 29 and the attached valve plug 18 from the sleeve 16 to the right in Figure 1 and out from the nipple 9 and the tank. The assembly is by the reverse order of movement.

As shown in Figures 2 and 4 the construction is almost identical to that described except that in this instance the valve plug 41 has a bore 42 therethrough which in cross-section is elongated or substantially elliptical in a transverse direction. The cross shaft 43 is of circular cross-section and fits into apertures 44 and 46 of circular cross-section within the sleeve 47. The construction is otherwise as previously described. In this instance there is still a transverse lost-motion between the valve plug and the sleeve, producing substantially the same operating characteristics as heretofore.

In both forms of the invention there is provided a float valve in which the valve plug is not only pivotable with respect to mounting but is also movable transversely and is rotatable with respect to mounting. The parts are all readily disassembled for cleaning and reassembled and are effective to provide a tight closure against any of the various fluids which pass through the valve. The valve has the characteristic of opening somewhat abruptly and closing somewhat abruptly in the initial opening and final closing movements. The valve need not be made with the greatest of precision since necessarily the somewhat resilient sealing ring in combination with the lost-motion mounting affords an even distribution of stresses and forces around the sealing parts of the valve.

What is claimed is:

1. A float valve for use in a tank comprising a nipple projecting therefrom, a sleeve telescoped within said nipple, said sleeve having diametrical apertures therein, means for detachably securing said sleeve to said nipple, a cross shaft spanning said sleeve and extending through said apertures into proximity with said nipple, a valve plug having a bore therethrough encompassing said shaft and of substantially larger size than said shaft to leave lost motion therebetween, a sealing ring on said valve plug and engageable with said sleeve, a stem projecting from said valve plug through said nipple into said tank, and a float on said stem.

2. A float valve comprising a sleeve, a valve plug disposed within said sleeve, said valve plug having a peripheral groove and a transverse bore of elliptical cross-section, a sealing ring in said groove and movable by said valve plug into and out of engagement with said sleeve, a cross shaft of circular cross-section passing through said bore and journalled in said sleeve, and a float mechanism connected to operate said valve plug.

3. A float valve comprising a sleeve, a valve plug disposed within said sleeve, said valve plug having a peripheral groove, a sealing ring in said groove and movable by said valve plug into and out of engagement with said sleeve, a cross shaft having a special interengagement with said sleeve and said valve plug, said special interengagement affording a pivotal and transverse lost-motion relationship between said valve plug and said sleeve, and a float mechanism connected to operate said valve plug.

4. A float valve comprising a sleeve, a valve plug disposed within said sleeve, said valve plug having a peripheral groove, means interrelating said valve plug and said sleeve for relative rotation and for transverse lost-motion, a float stem secured to said valve body, and a float on said stem.

5. A float valve comprising a sleeve having diametrical apertures therein of elliptical cross-section, a valve plug disposed within said sleeve, said valve plug having a peripheral groove and a transverse bore of circular cross-section, a sealing ring in said groove and movable by said valve plug into and out of engagement with said sleeve, a cross shaft of circular cross-section passing through said bore and extending into said apertures, and a float mechanism connected to operate said valve plug.

References Cited in the file of this patent

UNITED STATES PATENTS

| | | |
|---|---|---|
| 898,255 | O'Brian | Sept. 8, 1908 |
| 1,487,280 | Skaarnas | Mar. 18, 1924 |
| 2,684,077 | Shaffer | July 20, 1954 |